US012579697B2

(12) United States Patent
Kwong et al.

(10) Patent No.: US 12,579,697 B2
(45) Date of Patent: Mar. 17, 2026

(54) METHOD AND SYSTEM FOR COMPRESSING AND RECONSTRUCTING 3D MEDICAL IMAGES

(71) Applicant: City University of Hong Kong, Kowloon (HK)

(72) Inventors: Sam Tak Wu Kwong, Kowloon (HK); Xiangrui Liu, Kowloon (HK); Meng Wang, Kowloon (HK); Shiqi Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 406 days.

(21) Appl. No.: 18/338,801

(22) Filed: Jun. 21, 2023

(65) Prior Publication Data

US 2024/0428464 A1     Dec. 26, 2024

(51) Int. Cl.
| | |
|---|---|
| *G06T 9/00* | (2006.01) |
| *G06T 3/06* | (2024.01) |
| *H04N 13/161* | (2018.01) |
| *H04N 19/172* | (2014.01) |
| *H04N 19/174* | (2014.01) |
| *H04N 19/177* | (2014.01) |
| *H04N 19/184* | (2014.01) |
(Continued)

(52) U.S. Cl.
CPC ............... *G06T 9/001* (2013.01); *G06T 3/06* (2024.01); *H04N 13/161* (2018.05); *H04N 19/172* (2014.11); *H04N 19/174* (2014.11); *H04N 19/177* (2014.11); *H04N 19/184* (2014.11); *H04N 19/42* (2014.11); *H04N 19/44* (2014.11); *H04N 19/597* (2014.11); *H04N 19/85* (2014.11); *G06T 2200/04* (2013.01)

(58) Field of Classification Search
CPC .. G06T 9/00; G06T 9/001; G06T 3/06; G06T 7/50; G06T 7/55; G06T 11/00; G06T 2200/04; H04N 13/161; H04N 19/172; H04N 19/174; H04N 19/177; H04N 19/184; H04N 19/42; H04N 19/44; H04N 19/597; H04N 19/85
See application file for complete search history.

(56) References Cited

U.S. PATENT DOCUMENTS

| | | | |
|---|---|---|---|
| 6,799,569 B2 | 10/2004 | Danielsson et al. | |
| 6,937,767 B1 | 8/2005 | Burak et al. | |
(Continued)

OTHER PUBLICATIONS

Kumar, Pardeep, and Ashish Parmar, "Versatile Approaches for Medical Image Compression: A Review," Procedia Computer Science, 2020, pp. 1380-1389.
(Continued)

*Primary Examiner* — Scott A Rogers
(74) *Attorney, Agent, or Firm* — Renner, Kenner, Greive, Bobak, Taylor & Weber

(57) ABSTRACT

A method for compressing three-dimensional (3D) medical image. The method includes obtaining image data of a 3D medical image, performing a data conversion operation to convert the image data of the 3D medical image into video data of a sequence of frames each corresponding to a respective 2D image, and performing a video encoding operation to encode the video data of the sequence of frames to obtain encoded content data. The encoded content data can be used for reconstructing the 3D medical image.

32 Claims, 12 Drawing Sheets

(51) Int. Cl.

| | |
|---|---|
| *H04N 19/42* | (2014.01) |
| *H04N 19/44* | (2014.01) |
| *H04N 19/597* | (2014.01) |
| *H04N 19/85* | (2014.01) |

(56) References Cited

U.S. PATENT DOCUMENTS

| | | | | |
|---|---|---|---|---|
| 8,145,001 | B2 | 3/2012 | Khorasani et al. | |
| 9,111,345 | B2 | 8/2015 | Sato et al. | |
| 10,728,526 | B2 * | 7/2020 | Bai | H04W 56/001 |
| 11,238,592 | B2 * | 2/2022 | Cohen Maimon | G06T 17/00 |
| 11,711,544 | B2 * | 7/2023 | Tourapis | H04N 19/467 |
| | | | | 375/240.08 |
| 11,880,990 | B2 * | 1/2024 | Jang | G06T 7/80 |
| 12,289,470 | B2 * | 4/2025 | Sugio | H04N 23/60 |
| 2003/0198290 | A1 * | 10/2003 | Millin | H04N 19/597 |
| | | | | 375/240.01 |
| 2013/0093760 | A1 * | 4/2013 | Kwon | G06T 7/55 |
| | | | | 345/419 |
| 2015/0172681 | A1 | 6/2015 | Kim et al. | |
| 2022/0132125 | A1 * | 4/2022 | Yao | H04N 19/184 |
| 2024/0428927 | A1 * | 12/2024 | Kwong | H04N 19/174 |
| 2025/0069728 | A1 * | 2/2025 | Slynko | H04N 19/91 |
| 2025/0080711 | A1 * | 3/2025 | Yasuda | H04N 19/85 |

OTHER PUBLICATIONS

Doukas, Charalampos, and Ilias Maglogiannis, "Region of Interest Coding Techniques for Medical Image Compression," IEEE Engineering in Medicine and Biology Magazine, 2007, pp. 29-35.

Bruylants, Tim, Adrian Munteanu, and Peter Schelkens, "Wavelet Based Volumetric Medical Image Compression," Signal Processing: Image Communication, 2015, pp. 112-133.

Wang, Jun, and Kun Huang, "Medical Image Compression by Using Three-dimensional Wavelet Transformation." IEEE Transactions on Medical Imaging, 1996, pp. 547-554.

Ström, Jacob, and Pamela C. Cosman, "Medical image compression with lossless regions of interest," Signal Processing, 1997, pp. 155-171.

Kaur, Manpreet, and Vikas Wasson, "ROI Based Medical Image Compression for Telemedicine Application," Procedia Computer Science, 2015, pp. 579-585.

Shen, Liang, and Rangaraj M. Rangayyan, "A Segmentation-based Lossless Image Coding Method for High-resolution Medical Image Compression," IEEE Transactions on Medical imaging, 1997, pp. 301-307.

Jiaqi Zhang, Chuanmin Jia, Meng Lei, Shanshe Wang, Siwei Ma, and Wen Gao, "Recent Development of AVS Video Coding Standard: AVS3," in 2019 Picture Coding Symposium (PCS). IEEE, 2019, pp. 1-5.

Morozov, S. P., Andreychenko, A. E., Pavlov, N. A., Vladzymyrskyy, A. V., Ledikhova, N. V., Gombolevskiy, V. A., Blokhin, I. A., Gelezhe, P. B., Gonchar, A. V., and Chernina, V. Yu., "MosMed-Data: Chest CT Scans With COVID-19 Related Findings Dataset," arXiv, 2020, pp. 1-4.

K Scott Mader, "TRABIT2019 Imaging Biomarkers", Kaggle, 2019. (//kaggle.com/competitions/trabit2019-imaging-biomarkers).

* cited by examiner

300

Obtain image data of a 3D medical image

302

Perform a data conversion operation to convert the image data of the 3D medical image into video data of a sequence of frames

304

Perform a video encoding operation to encode the video data of the sequence of frames to obtain encoded content data

306

Slice 3

Slice 52

Slice 2

Slice 51

Slice 1

Slice 50

8-bit Odd Frame 8-bit Even Frame 16-bit Frame

Low 8-bit Frame (Discarded)

High 8-bit Frame 16-bit Frame

METHOD AND SYSTEM FOR COMPRESSING AND RECONSTRUCTING 3D MEDICAL IMAGES

TECHNICAL FIELD

The invention generally relates to compression and/or reconstruction of medical image, in particular three-dimensional (3D) medical image.

BACKGROUND

Medical imaging techniques, such as ultrasound, magnetic resonance imaging (MRI), computed tomography (CT), etc., may be used to generate 3D medical images. Such 3D medical image may contain a relatively large amount of data hence may have a relatively large file size. Compression of the 3D medical image may reduce the amount of data hence the file size. However, the compression needs to be optimally performed to avoid excessive loss of useful data.

SUMMARY OF THE INVENTION

In a first aspect, there is provided a method for compressing 3D medical image. The method comprises obtaining image data of a 3D medical image, and performing a data conversion operation to convert the image data of the 3D medical image into video data of a sequence of frames. Each of the frames corresponds to a respective 2D image (e.g., 2D medical image). The method further comprises performing a video encoding operation to encode the video data of the sequence of frames to obtain encoded content data. The encoded content data is operable for reconstruction of the 3D medical image.

Optionally, the performing of the data conversion operation comprises: processing the image data of the 3D medical image to obtain image data of a plurality of 2D images; and performing a bit-depth conversion operation on the image data of the plurality of 2D images to obtain the video data of the sequence of frames.

Optionally, processing the image data of the 3D medical image to obtain image data of the plurality of 2D images comprises: partitioning the 3D medical image along an axis perpendicular to a partition plane to obtain a plurality of slices that can be represented as the plurality of 2D images, and for each pixel of each of the plurality of 2D images, respectively mapping the pixel to an n-bit integer to obtain a n-bit pixel. In some examples, n may be 8. In some examples, n may be 10. In some examples, n may be 16. In some examples, n may be another integer.

In some examples, the partition plane is a transverse plane associated with the 3D medical image. In some examples, the partition plane is a coronal plane associated with the 3D medical image. In some examples, the partition plane is a sagittal plane associated with the 3D medical image.

Optionally, the mapping is performed based on a data range or data boundary of the 3D medical image. In some embodiments, the method further comprises: prior to the mapping, determining the data range or data boundary of the 3D medical image.

Optionally, the mapping is performed based on a specified or defined (e.g., user-specified or user-defined) data range or data boundary. In some embodiments, the method further comprises: prior to the mapping, receiving a user input associated with a user-specified data range or data boundary.

In some embodiments, the bit-depth conversion operation is based on bit-interlacing.

Optionally, the bit-depth conversion operation based on bit-interlacing comprises: converting each n-bit pixel into two respective m-bit pixels, and forming two m-bit sequences based on the m-bit pixels of the plurality of 2D images. The video data of the sequence of frames comprises the two m-bit sequences. In some examples, the video data of the sequence of frames may comprise other data content. In some examples, n=16 and m=8. In some examples, n and m may be other integers. Optionally, for each of the n-bit pixel, the converting respectively includes: applying a first bit mask to the n-bit pixel to extract m bits, applying a second bit mask to the n-bit pixel to extract another m bits, concatenating the m bits to an m-bit pixel, and concatenating the another m bits to another m-bit pixel. Optionally, applying a first bit mask to the n-bit pixel to extract m bits comprises applying the first bit mask to the n-bit pixel to extract m even-position bits. Optionally, applying a second bit mask to the n-bit pixel to extract another m bits comprises applying a second bit mask to the n-bit pixel to extract m odd-position bits.

In some embodiments, the bit-depth conversion operation is based on bit-shifting.

Optionally, the bit-depth conversion operation based on bit-shifting comprises: converting each n-bit pixel into a respective m-bit pixel, and forming a m-bit sequence based on the m-bit pixels of the plurality of 2D images. The video data of the sequence of frames comprises the m-bit sequence. In some examples, the video data of the sequence of frames may comprise other data content. In some examples, n=16 and m=8 or 10. In some examples, n and m may be other integers. Optionally, for each of the n-bit pixel, the converting respectively includes: performing bitwise right-shifting on the higher m bits of the n-bit pixel, and discarding or dropping the lower n-m bits of the n-bit pixel, thereby forming the m-bit pixel.

Optionally, the performing of the data conversion operation further comprises: performing a color conversion operation to convert a color space of the video data of the sequence of frames. Optionally, the performing of the data conversion operation further comprises: performing a color conversion operation to convert a color space of the image data of the 3D medical image. Optionally, the performing of the data conversion operation further comprises: performing a color conversion operation to convert a color space of the image data of the plurality of 2D images.

Optionally, the performing of the data conversion operation further comprises: generating a data conversion indicator (e.g., flag(s)) indicating one or more properties associated with the processing of the image data of the 3D medical image and/or the performing of the bit-depth conversion operation, and performing an encoding operation to encode the data conversion indicator to obtain encoded data conversion indicator data. The encoded data conversion indicator data is operable for facilitating reconstruction of the 3D medical image.

Optionally, the data conversion indicator indicates one or more of: the data range or data boundary of the 3D medical image, or one or more properties of the performed bit-depth conversion operation. Optionally, the one or more properties of the performed bit-depth conversion operation comprises: method on which the performed bit-depth conversion operation is based. Optionally, the method on which the performed bit-depth conversion operation is based is bit-interlacing or bit-shifting. Optionally, if the bit-depth conversion operation is based on bit-shifting, the one or more properties of the performed bit-depth conversion operation further comprises: a bit-depth associated with a sequence generated by bit-shifting.

The video encoding operation may be arranged to: reduce inter-frame redundancy of the video data of the sequence of frames and/or reduce intra-frame redundancy of the video data of the sequence of frames. The encoded content data may be in bitstream format.

Optionally, the video encoding operation is based on Versatile Video Coding (VVC). Optionally, the video encoding operation is based on High Efficiency Video Coding (HEVC). Optionally, the video encoding operation is based on H.264/MPEG-4 Advanced Video Coding (AVC). Optionally, the video encoding operation is based on Audio Video coding Standard (AVS), such as AVS3.

The video encoding operation is performed by a video encoder, which may be implemented by hardware and/or software. Optionally, the video encoder comprises a Versatile Video Coding (VVC) based encoder. Optionally, the video encoder comprises a High Efficiency Video Coding (HEVC) based encoder. Optionally, the video encoder comprises a H.264/MPEG-4 Advanced Video Coding (AVC) based encoder. Optionally, the video encoder comprises an Audio Video coding Standard (AVS) based encoder. Optionally, the Audio Video coding Standard (AVS) based encoder comprises an AVS3 based encoder.

Optionally, the method further comprises storing the encoded content data as one or more data files. Optionally, the method further comprises storing the encoded data conversion indicator data as one or more data files. Optionally, the method further comprises storing the encoded content data and the encoded data conversion indicator data as one or more data files.

Optionally, the 3D medical image is a magnetic resonance imaging (MRI) image. Optionally, the 3D medical image is a computed tomography (CT) image. In some other examples, the 3D medical image may be a medical image of other imaging modality (other than CT and MRI). The 3D medical image may be an image of a body part of a human or animal, an image of a phantom, etc.

In a second aspect, there is provided a system for compressing 3D medical image, comprising: one or more processors, and memory storing one or more programs configured to be executed by the one or more processors, the one or more programs including instructions for performing or facilitating performing of the method of the first aspect. In some embodiments, the system may further include a display for displaying images (2D or 3D images, e.g., generated from image data or video data).

In a third aspect, there is provided a non-transitory computer-readable storage medium storing one or more programs configured to be executed by one or more processors, the one or more programs including instructions for performing or facilitating performing of the method of the first aspect.

In a fourth aspect, there is provided a method for reconstructing 3D medical image. The method comprises: performing a video decoding operation to decode encoded content data to obtain video data of a sequence of frames, each of the frames corresponding to a respective 2D image (e.g., 2D medical image), and performing an inverse data conversion operation to convert the video data of the sequence of frames into image data of a 3D medical image. The image data of the 3D medical image is operable for reconstructing the 3D medical image.

Optionally, the encoded content data may be the encoded content data obtained using the method of the first aspect. The encoded content data may be in bitstream format.

Optionally, the video decoding operation is based on Versatile Video Coding (VVC). Optionally, the video decoding operation is based on High Efficiency Video Coding (HEVC). Optionally, the video decoding operation is based on H.264/MPEG-4 Advanced Video Coding (AVC). Optionally, the video decoding operation is based on Audio Video coding Standard (AVS), such as AVS3.

The video decoding operation is performed by a video decoder, which may be implemented by hardware and/or software. Optionally, the video decoder comprises a Versatile Video Coding (VVC) based decoder. Optionally, the video decoder comprises a High Efficiency Video Coding (HEVC) based decoder. Optionally, the video decoder comprises a H.264/MPEG-4 Advanced Video Coding (AVC) based decoder. Optionally, the video decoder comprises an Audio Video coding Standard (AVS) based decoder. Optionally, the Audio Video coding Standard (AVS) based decoder comprises an AVS3 decoder.

Optionally, the performing of the inverse data conversion operation comprises: performing an inverse bit-depth conversion operation on the video data of the sequence of frames to obtain image data of a plurality of 2D images, and processing the image data of the plurality of 2D images to obtain the image data of the 3D medical image.

In some embodiments, the inverse bit-depth conversion operation is based on inverse bit-interlacing. Optionally, the video data of the sequence of frames comprises two m-bit sequences (the video data of the sequence of frames may comprise other data content), and the inverse bit-depth conversion operation based on inverse bit-interlacing comprises: determining, based on the two m-bit sequences, a plurality of m-bit pixels for the plurality of 2D images, and converting two respective m-bit pixels into a respective n-bit pixel for each pixel of each of the plurality of 2D images such that each of the plurality of 2D images comprises a plurality of n-bit pixels. In some examples, $n=16$ and $m=8$. In some examples, n and m may be other integers.

In some embodiments, the inverse bit-depth conversion operation is based on inverse bit-shifting. Optionally, the video data of the sequence of frames comprises an m-bit sequence (the video data of the sequence of frames may comprise other data content), and the inverse bit-depth conversion operation based on inverse bit-shifting comprises: determining, based on the m-bit sequence, a plurality of m-bit pixels for the plurality of 2D images, and converting each respective m-bit pixel into a respective n-bit pixel for each pixel of each of the plurality of 2D images such that each of the plurality of 2D images comprises a plurality of n-bit pixels. In some examples, $n=16$ and $m=8$ or 10. In some examples, n and m may be other integers. Optionally, for each of the m-bit pixel, the converting includes: performing bitwise left-shifting on the m bits of the m-bit pixel, and after the bitwise left-shifting, filling zeros to n-m lower bits, thereby forming the n-bit pixel.

Optionally, the plurality of 2D images comprises a plurality of n-bit pixels, and processing the image data of the plurality of 2D images to obtain the image data of the 3D medical image comprises: for each n-bit pixel of each of the plurality of 2D images, respectively inversely mapping the n-bit pixel to a pixel based on a data range or data boundary and combining (e.g., splicing) a plurality of slices represented by the plurality of 2D images with inversely mapped pixels along an axis perpendicular to a partition plane to obtain the 3D medical image. In some examples, n is 8. In some examples, n is 10. In some examples, n is 16. In some examples, n may be another integer.

Optionally, the data range or data boundary is a data range or data boundary of the 3D medical image. Optionally, the data range or data boundary is a specified or defined (e.g., user-specified or user-defined) data range or data boundary.

Optionally, the partition plane is a transverse plane associated with the 3D medical image. Optionally, the partition plane is a coronal plane associated with the 3D medical image. Optionally, the partition plane is a sagittal plane associated with the 3D medical image.

Optionally, the performing of the inverse data conversion operation further comprises: performing a decoding operation to decode encoded data conversion indicator data to obtain a data conversion indicator (e.g., flag(s)), the data conversion indicator indicating one or more properties associated with a processing of the image data of the 3D medical image and/or a performing of the bit-depth conversion operation. The data conversion indicator is operable for facilitating reconstruction of the 3D medical image.

Optionally, the data conversion indicator indicates one or more of: a data range or data boundary of the 3D medical image, or one or more properties of the performed bit-depth conversion operation. Optionally, the one or more properties of the performed bit-depth conversion operation comprises: method on which the performed bit-depth conversion operation is based. Optionally, the method on which the performed bit-depth conversion operation is based is bit-interlacing or bit-shifting. Optionally, if the bit-depth conversion operation is based on bit-shifting, the one or more properties of the performed bit-depth conversion operation further comprises a bit-depth associated with a sequence generated by bit-shifting.

Optionally, the performing of the inverse data conversion operation further comprises: performing an inverse color conversion operation to convert a color space of the video data of the sequence of frames or a color space of the image data of the 3D medical image or a color space of the image data of the plurality of 2D images.

Optionally, the 3D medical image is a magnetic resonance imaging (MRI) image.

Optionally, the 3D medical image is a computed tomography (CT) image. In some other examples, the 3D medical image may be a medical image of another imaging modality (other than CT and MRI). The 3D medical image may be an image of a body part of a human or animal, an image of a phantom, etc.

Optionally, the method further comprises reconstructing the 3D medical image based on the image data of the 3D medical image. Optionally, the method further comprises reconstructing the 3D medical image based on the image data of the 3D medical image and the data conversion indicator.

Optionally, the method further comprises outputting the reconstructed 3D medical image for display.

In a fifth aspect, there is provided a system for compressing 3D medical image, comprising: one or more processors, and memory storing one or more programs configured to be executed by the one or more processors, the one or more programs including instructions for performing or facilitating performing of the method of the fourth aspect. In some embodiments, the system may further include display for displaying images (2D or 3D images, e.g., generated from image data or video data).

In a sixth aspect, there is provided a non-transitory computer-readable storage medium storing one or more programs configured to be executed by one or more processors, the one or more programs including instructions for performing or facilitating performing of the method of the fourth aspect.

In a seventh aspect, there is provided a method comprising the method of the first aspect and the method of the fourth aspect.

In an eighth aspect, there is provided a system comprising: one or more processors, and memory storing one or more programs configured to be executed by the one or more processors, the one or more programs including instructions for performing or facilitating performing of the method of the seventh aspect. In some embodiments, the system may further include display for displaying images (2D or 3D images, e.g., generated from image data or video data).

In a ninth aspect, there is provided a non-transitory computer-readable storage medium storing one or more programs configured to be executed by one or more processors, the one or more programs including instructions for performing or facilitating performing of the method of the seventh aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for one or more of: manufacture tolerance, degradation, trend, tendency, imperfect practical condition(s), etc.

BRIEF DESCRIPTION OF THE DRAWINGS

Embodiments of the invention will now be described, by way of example, with reference to the accompanying drawings in which.

DETAILED DESCRIPTION

Figures 1, 2:
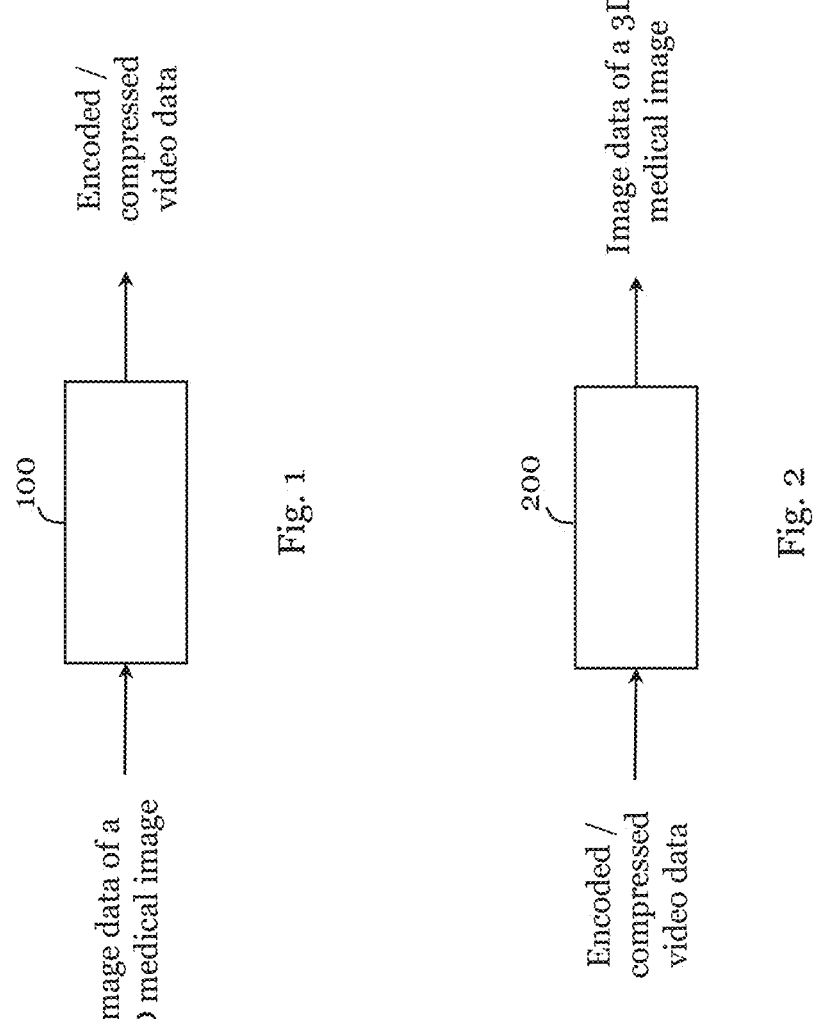
FIG. 1 is a schematic diagram illustrating a medical image compression operation in some embodiments of the invention.
FIG. 2 is a schematic diagram illustrating a medical image reconstruction operation in some embodiments of the invention.

FIG. 1 shows a system 100 that is arranged to process image data of a 3D medical image to provide encoded or compressed video data in some embodiments. The system 100 may be implemented using hardware and/or software.

FIG. 2 shows a system 200 that is arranged to process encoded or compressed video data to provide image data of a 3D medical image in some embodiments. The encoded or compressed video data processed by the system 200 may be the encoded or compressed video data generated by the system 100. The system 200 may be implemented using hardware and/or software.

In some embodiments, the systems 100, 200 can be implemented as separate systems. In some embodiments, the systems 100, 200 can be implemented together as a single system (e.g., combined as a single system).

Figure 3:
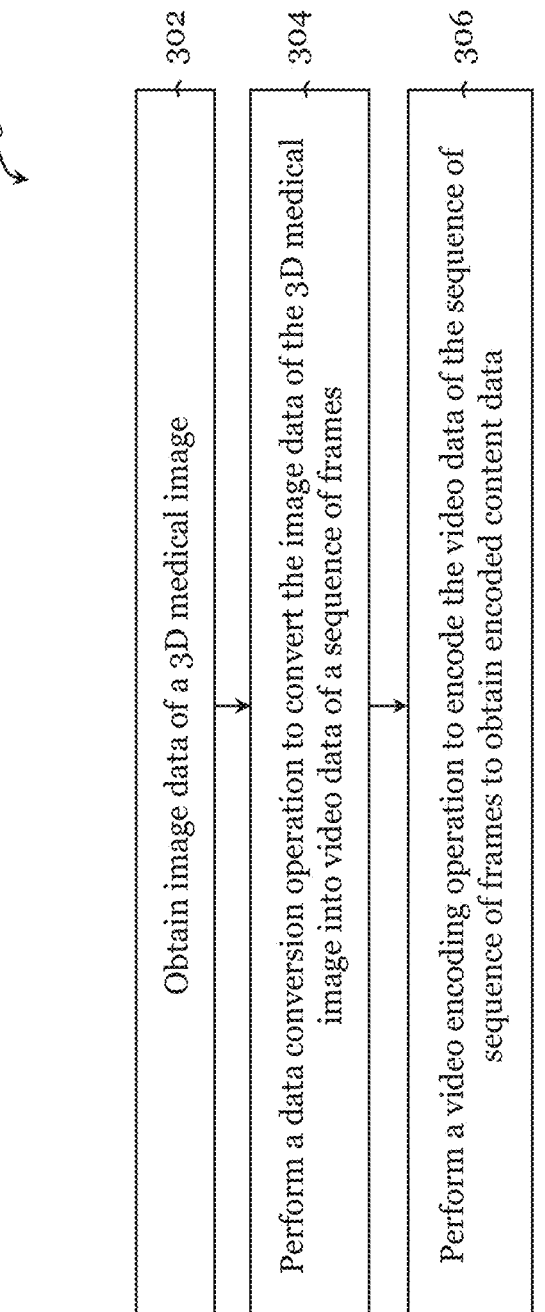
FIG. 3 is a flowchart illustrating a method for compressing 3D medical image in some embodiments of the invention.

FIG. 3 shows a method 300 for compressing 3D medical image in some embodiments of the invention. The method 300 may be performed using the system 100 in FIG. 1.

The method 300 includes, in step 302, obtaining image data of a 3D medical image. The 3D medical image may be a magnetic resonance imaging (MRI) image, a computed tomography (CT) image, or a medical image of another imaging modality (other than CT and MRI). The 3D medical image may be an image of a body part of a human or animal, an image of a phantom, etc. In some embodiments the image data of a 3D medical image is obtained from an imaging device (e.g., MRI machine, CT machine, etc.).

The method 300 also includes, in step 304, performing a data conversion operation to convert the image data of the 3D medical image into video data of a sequence of frames. Each of the frames corresponds to a respective 2D image (e.g., 2D medical image, if the image includes relevant medical content). While the 3D medical image is not a video, converting the image data of the 3D medical image into video data enables the use of video data processing technique (e.g., video coding technique) for processing the video data hence the image data of the 3D medical image.

3D medical image can be suitably processed in this way because a 3D medical image may generally include at least some slices or frames with related contents (e.g., different images of adjacent sections of the same body part).

In some embodiments, the performing of the data conversion operation in step 304 may include processing the image data of the 3D medical image to obtain image data of 2D images, and performing a bit-depth conversion operation on the image data of the 2D images to obtain the video data of the sequence of frames (the frames correspond to 2D images, which, due to the bit-depth conversion operation, are different from the 2D images of the image data of the 2D images).

The processing of the image data of the 3D medical image to obtain image data of 2D images may include, e.g., partitioning the 3D medical image along an axis perpendicular to a partition plane to obtain slices that can be represented as 2D images, and for each pixel of each of the 2D images, respectively mapping the pixel to an n-bit integer to obtain a n-bit pixel. n is an integer such as 8, 10, or 16. The partition plane may be a transverse plane associated with the 3D medical image, a coronal plane associated with the 3D medical image, or a sagittal plane associated with the 3D medical image. The mapping may be performed based on: a data range or data boundary of the 3D medical image or a specified or defined (e.g., user-specified or user-defined) data range or data boundary. In some examples, the method 300 also includes, prior to the mapping: determining the data range or data boundary of the 3D medical image, or receiving a user input associated with the specified data range or data boundary.

In some embodiments, the bit-depth conversion operation may be based on bit-interlacing. In some examples, the bit-depth conversion operation based on bit-interlacing may include: converting each n-bit pixel into two respective m-bit pixels, and forming two m-bit sequences based on the m-bit pixels of the 2D images. The video data of the sequence of frames may include at least the two m-bit sequences. n and m are integers. In some examples, n=16 and m=8. In some examples, for each of the n-bit pixel, the converting respectively includes: applying a first bit mask to the n-bit pixel to extract m bits, applying a second bit mask to the n-bit pixel to extract another m bits, concatenating the m bits to an m-bit pixel, and concatenating the another m bits to another m-bit pixel. In some examples, applying a first bit mask to the n-bit pixel to extract m bits includes applying the first bit mask to the n-bit pixel to extract m even-position bits. In some examples, applying a second bit mask to the n-bit pixel to extract another m bits includes applying a second bit mask to the n-bit pixel to extract m odd-position bits.

In some embodiments, the bit-depth conversion operation may be based on bit-shifting. In some examples, the bit-depth conversion operation based on bit-shifting may include: converting each n-bit pixel into a respective m-bit pixel, and forming a m-bit sequence based on the m-bit pixels of the 2D images. The video data of the sequence of frames includes at least the m-bit sequence. n and m are integers. In some examples, n=16 and m=8 or 10. In some examples, for each of the n-bit pixel, the converting respectively includes: performing bitwise right-shifting on the higher m bits of the n-bit pixel, and discarding or dropping the lower n-m bits of the n-bit pixel, thereby forming the m-bit pixel.

In some embodiments, the performing of the data conversion operation in step 304 may include generating a data conversion indicator (e.g., flag(s)) indicating one or more properties associated with the processing of the image data of the 3D medical image and/or the performing of the bit-depth conversion operation. The data conversion indicator may indicate one or more of: the data range or data boundary of the 3D medical image, or one or more properties of the performed bit-depth conversion operation. Examples of the one or more properties include: method on which the performed bit-depth conversion operation is based (such as bit-interlacing or bit-shifting), a bit-depth associated with a sequence generated by bit-shifting (if the bit-depth conversion operation is based on bit-shifting). In these embodiments, the performing of the data conversion operation in step 304 may further include performing an encoding operation to encode the data conversion indicator to obtain encoded data conversion indicator data. The encoded data conversion indicator data can be used to facilitate reconstruction of the 3D medical image.

In some embodiments, the performing of the data conversion operation in step 304 may include performing a color conversion operation to convert a color space of the video data of the sequence of frames, or performing a color conversion operation to convert a color space of the image data of the 3D medical image, and/or performing a color conversion operation to convert a color space of the image data of the 2D images.

The method 300 also includes, in step 306, performing a video encoding operation to encode the video data of the sequence of frames to obtain encoded content data. The encoded content data can be used for reconstruction of the 3D medical image. The video encoding operation may be arranged to reduce inter-frame redundancy of the video data of the sequence of frames and/or reduce intra-frame redundancy of the video data of the sequence of frames. The encoded content data may be in bitstream format. The video encoding operation may be based on video coding method/standard such as but not limited to: Versatile Video Coding (VVC), High Efficiency Video Coding (HEVC), H.264/MPEG-4 Advanced Video Coding (AVC), Audio Video coding Standard (AVS), such as AVS3, etc.

Although not specifically illustrated, in some embodiments, the method 300 further includes storing the encoded content data and/or the encoded data conversion indicator data as one or more data files. In some examples, the encoded content data and the encoded data conversion indicator data are combined and are then stored as a single data file.

Figure 4:
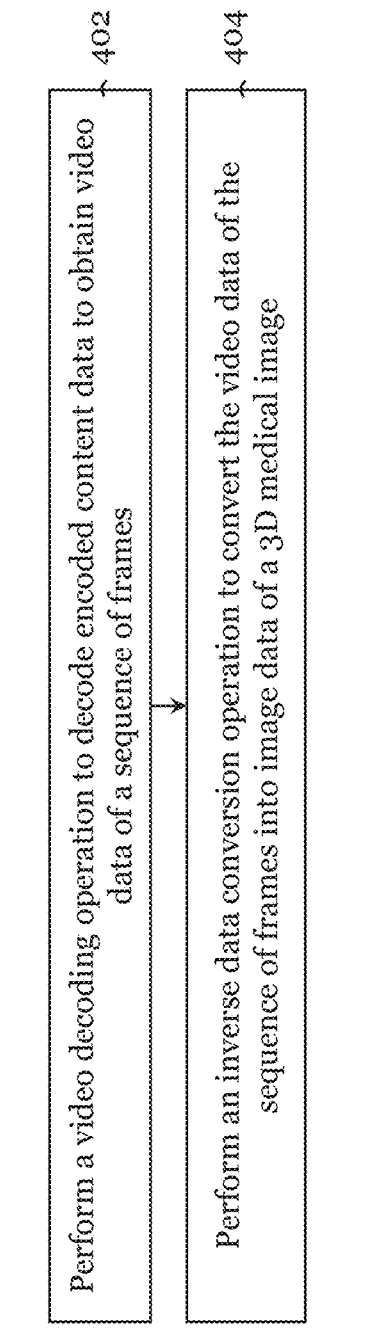
FIG. 4 is a flowchart illustrating a method for reconstructing 3D medical image in some embodiments of the invention.

FIG. 4 shows a method 400 for reconstructing 3D medical image in some embodiments of the invention. The method 400 may be performed using the system 200 in FIG. 2.

The method 400 includes, in step 402, performing a video decoding operation to decode encoded content data to obtain video data of a sequence of frames. Each of the frames corresponds to a respective 2D image (e.g., 2D medical image, if the image includes relevant medical content). The encoded content data may be the encoded content data obtained using the method 300 of FIG. 3. The encoded content data may be in bitstream format. In step 402, the video decoding operation may be based on video decoding method/standard such as but not limited to: Versatile Video Coding (VVC), High Efficiency Video Coding (HEVC), H.264/MPEG-4 Advanced Video Coding (AVC), Audio Video coding Standard (AVS), such as AVS3, etc.

The method 400 also includes, in step 404, performing an inverse data conversion operation to convert the video data of the sequence of frames into image data of a 3D medical image. The image data of the 3D medical image can be used to reconstruct the 3D medical image. The 3D medical image may be a magnetic resonance imaging (MRI) image, a computed tomography (CT) image, or a medical image of other imaging modality (other than CT and MRI). The 3D medical image may be an image of a body part of a human or animal, an image of a phantom, etc. In some embodiments the image data of a 3D medical image is obtained from an imaging device (e.g., MRI machine, CT machine, etc.).

In some embodiments, the performing of the inverse data conversion operation in step 404 may include performing an inverse bit-depth conversion operation on the video data of the sequence of frames to obtain image data of 2D images, and processing the image data of the 2D images to obtain the image data of the 3D medical image.

In some embodiments, the inverse bit-depth conversion operation may be based on inverse bit-interlacing. In some examples, the video data of the sequence of frames includes, at least, two m-bit sequences, and the inverse bit-depth conversion operation based on inverse bit-interlacing includes: determining, based on the two m-bit sequences, m-bit pixels for the 2D images, and converting two respective m-bit pixels into a respective n-bit pixel for each pixel of each of the 2D images such that each of the 2D images includes n-bit pixels. n and m are integers. In some examples, n=16 and m=8.

In some embodiments, the inverse bit-depth conversion operation is based on inverse bit-shifting. In some examples, the video data of the sequence of frames includes, at least, an m-bit sequence, and the inverse bit-depth conversion operation based on inverse bit-shifting includes: determining, based on the m-bit sequence, m-bit pixels for the 2D images, and converting each respective m-bit pixel into a respective n-bit pixel for each pixel of each of the 2D images such that each of the 2D images includes n-bit pixels. n and m are integers. In some examples, n=16 and m=8 or 10. In some examples, for each of the m-bit pixel, the converting includes: performing bitwise left-shifting on the m bits of the m-bit pixel, and after the bitwise left-shifting, filling zeros to n-m lower bits, thereby forming the n-bit pixel.

In some embodiments, the 2D images includes n-bit pixels, and processing the image data of the 2D images to obtain the image data of the 3D medical image includes: for each n-bit pixel of each of the 2D images, respectively inversely mapping the n-bit pixel to a pixel based on a data range or data boundary and combining (e.g., splicing) slices represented by the 2D images with inversely mapped pixels along an axis perpendicular to a partition plane to obtain the 3D medical image. n is an integer such as 8, 10, or 16. The data range or data boundary may be a data range or data boundary of the 3D medical image, or may be a specified data range or data boundary. The partition plane may be a transverse plane associated with the 3D medical image, a coronal plane associated with the 3D medical image, or a sagittal plane associated with the 3D medical image.

In some embodiments, the performing of the inverse data conversion operation in step 404 may include performing a decoding operation to decode encoded data conversion indicator data to obtain a data conversion indicator (e.g., flag(s)). The data conversion indicator may be the data conversion indicator in the method 300 of FIG. 3. The data conversion indicator can be used to facilitate reconstruction of the 3D medical image.

In some embodiments, the performing of the inverse data conversion operation in step 404 may include performing an inverse color conversion operation to convert a color space of the video data of the sequence of frames, or performing an inverse color conversion operation to convert a color space of the image data of the 3D medical image, or performing an inverse color conversion operation to convert a color space of the image data of the 2D images.

Although not specifically illustrated, in some embodiments, the method 400 further includes reconstructing the 3D medical image based on the image data of the 3D medical image. In some embodiments, the method 400 further includes reconstructing the 3D medical image based on the image data of the 3D medical image and the data conversion indicator. In some embodiments, the method 400 further includes outputting the reconstructed 3D medical image for display.

Figure 5:
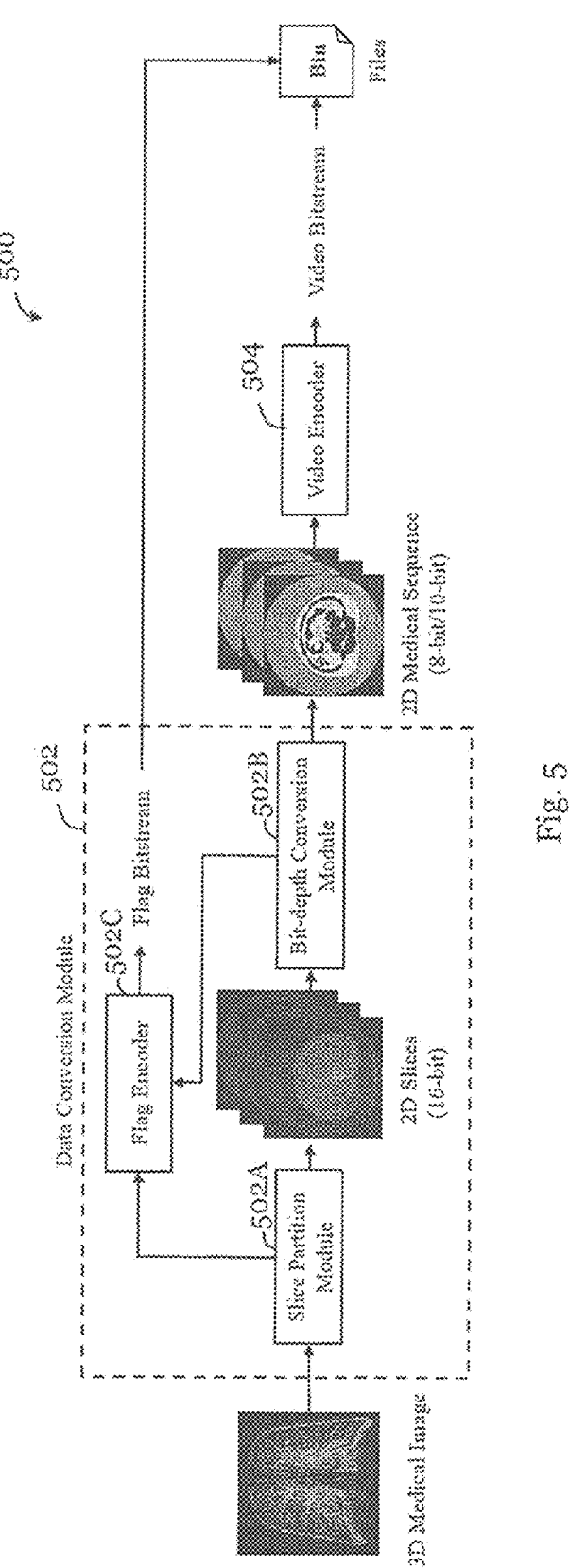
FIG. 5 is a schematic diagram illustrating an encoding operation for compressing a 3D medical image in one embodiment of the invention.

FIG. 5 illustrates an encoding operation 500 for compressing a 3D medical image in one embodiment of the invention. The encoding operation 500 in FIG. 5 can be considered as a specific example of the method 300 of FIG. 3, as the encoding operation 500 also generally includes obtaining image data of a 3D medical image, performing a data conversion operation to convert the image data of the 3D medical image into video data of a sequence of frames, and performing a video encoding operation to encode the video data of the sequence of frames to obtain encoded content data. The various modules and encoders illustrated in the encoding operation 500 in FIG. 5 can be implemented by hardware and/or software.

In this embodiment, in the encoding operation 500, an original 3D medical image is processed by a data conversion module 502 and is converted to a 2D medical sequence. Specifically, the 3D medical image is first partitioned to generate the 16-bit 2D slices, then the 16-bit 2D slices are further converted to 8-bit or 10-bit 2D medical sequence that can be compressed by a video encoder. A video encoder 504 compresses the 8-bit or 10-bit 2D medical sequence to video bitstream. In this embodiment, flags are used to indicate one or more properties associated with the processing performed by the data conversion module 502. The flags can be compressed by a flag encoder 502C. The flag encoder 502C compresses the flags into flag bitstream. In this embodiment, the video bitstream and the flag bitstream are combined as a single bitstream, which is then written to a data file.

In this embodiment, the data conversion module 502 is operable to convert the 3D medical image into 2D medical sequences, which can then be compressed by video encoder 504. In this embodiment, the data conversion module 502 includes a slice partition module 502A, a bit-depth conversion module 502B, and a flag encoder 502C.

In this embodiment, the slice partition module 502A is used to convert the input 3D medical image $X \in R^{H \times W \times D}$ into a set of slices representable as a set of 16-bit 2D images Y.

In the slice partition module 502A, data boundaries $x_{min}$ and $x_{max}$ of the 3D medical image X are first calculated, i.e., $$x_{min} = \min(X), \tag{1}$$

$$x_{max} = \max(X).$$

Subsequently, the 3D medical image X is partitioned into a set of slices (representable as a set of 2D images Y) along a specified axis, wherein each pixel of each of the 2D images is mapped to a 16-bit integer.

In this embodiment, the mapping process can be formulated as follows:

$$y = \text{round}\left(\frac{x - x_{min}}{x_{max} - x_{min}} * 2^{16}\right), \tag{2}$$

where x is the pixel of X, y is a pixel of a 2D image (of 2D images Y), and round (·) indicates round operation.

In one example, the partitioned axis is specified as the axis perpendicular to the transverse plane for a CT medical image. In one example, the partitioned axis is specified as the axis perpendicular to the sagittal plane for an MRI medical image.

Figure 6C:
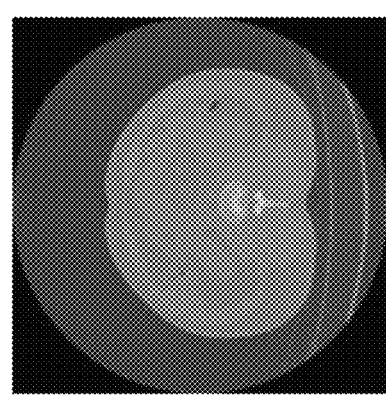
FIG. 6C is an image of yet another slice generated from the 3D CT image in one example.
Figure 6B:
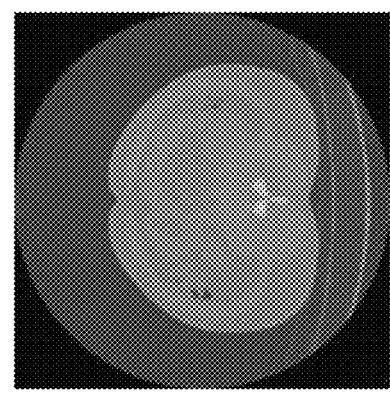
FIG. 6B is an image of another slice generated from the 3D CT image in one example.
Figure 6A:
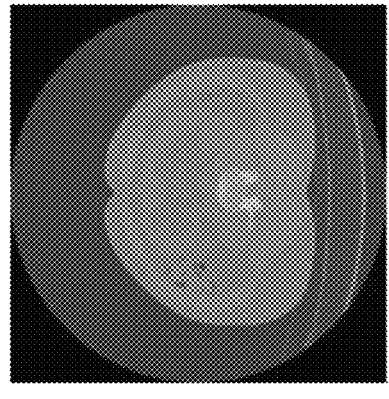
FIG. 6A is an image of a slice generated from a 3D CT image in one example.

FIGS. 6A to 6C show the 2D slices (images) generated from a 3D CT image using the slice partition module 502A.

Figure 7C:
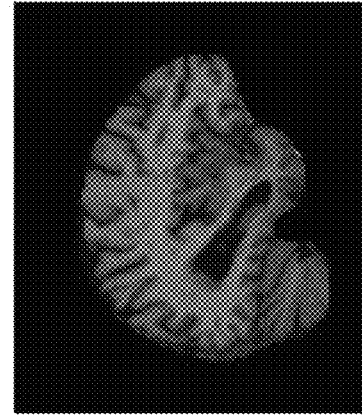
FIG. 7C is an image of yet another slice generated from the 3D MRI image in one example.
Figure 7B:
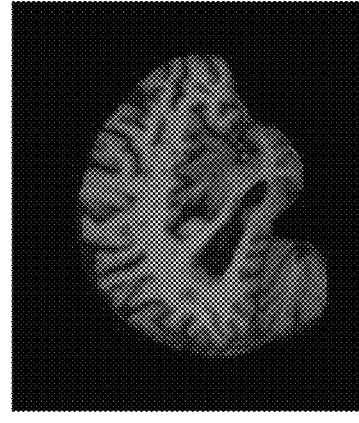
FIG. 7B is an image of another slice generated from the 3D MRI image in one example.
Figure 7A:
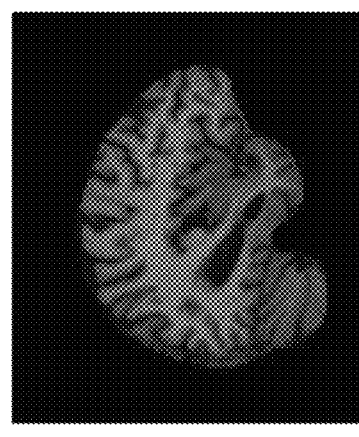
FIG. 7A is an image of a slice generated from a 3D MRI image in one example.

FIGS. 7A to 7C show the 2D slices (images) generated from a 3D MRI image using the slice partition module 502A.

In one embodiment, the bit-depth conversion module 502B is applied to process each 16-bit pixel of the 2D images Y to generate 8-bit or 10-bit 2D medical sequence Z that can be compressed by the video encoder 504.

Figure 8:
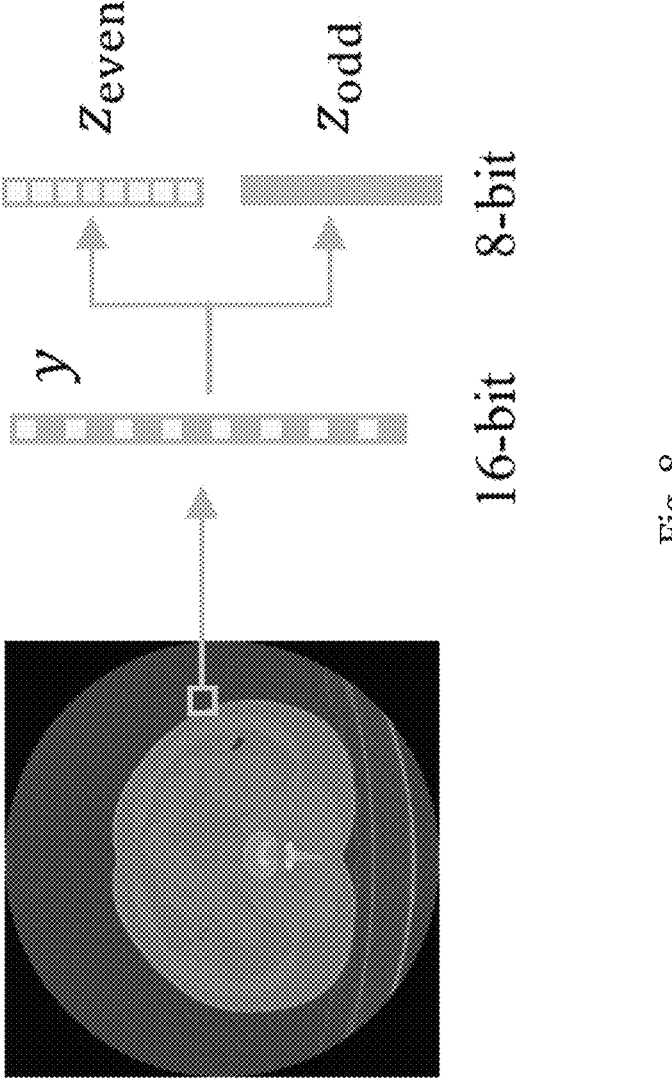
FIG. 8 is a schematic diagram illustrating a bit-interlacing based bit-depth conversion operation in one embodiment of the invention.

In one example, the bit-depth conversion module 502B is arranged to perform bit-depth conversion based on bit-interlacing. FIG. 8 illustrates an example bit-depth conversion based on bit-interlacing. In this example, two sets of bit masks are utilized to extract odd position bits and even position bits of the 16-bit pixel y, respectively. The extraction process can be formulated as follows (note: & is a bitwise AND operator):

$$z_{odd} = y \, \& \, 1010101010101010, \tag{3}$$

$$z_{even} = y \, \& \, 0101010101010101.$$

Then, the extracted bits are concatenated to an 8-bit pixel. In this way, the 16-bit sequence of the 2D images Y can be split into two 8-bit sequences.

Figure 9C:
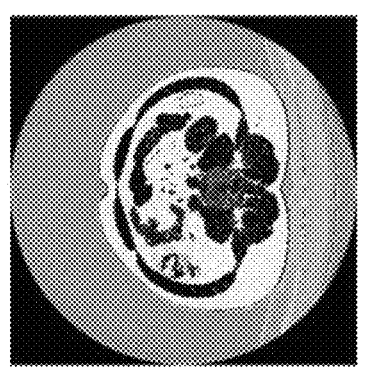
FIG. 9C is another 8-bit image obtained by performing the bit-interlacing based bit-depth conversion operation of FIG. 8 on the 16-bit image of FIG. 9A in one example.
Figure 9B:
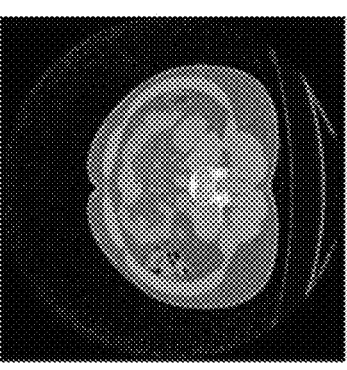
FIG. 9B is an 8-bit image obtained by performing the bit-interlacing based bit-depth conversion operation of FIG. 8 on the 16-bit image of FIG. 9A in one example.
Figure 9A:
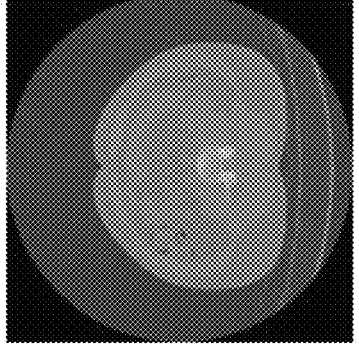
FIG. 9A is a 16-bit image of a slice generated from a 3D CT image in one example.

FIGS. 9A to 9C show the images before (FIG. 9A) and after (FIGS. 9B and 9C) processing by the bit-depth conversion module 502B using the bit-depth conversion based on bit-interlacing of FIG. 8.

Figure 10:
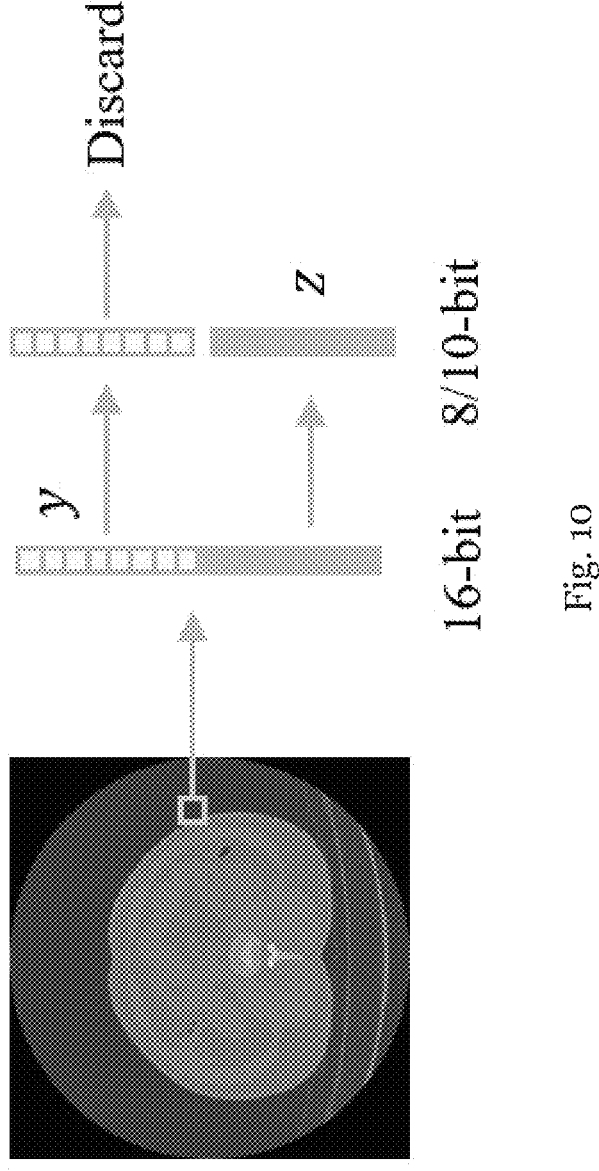
FIG. 10 is a schematic diagram illustrating a bit-shifting based bit-depth conversion operation in one embodiment of the invention.

In another example, the bit-depth conversion module 502B is arranged to perform bit-depth conversion based on bit-shifting. For example, bit-depth conversion based on bit-shifting may generate 10-bit or 8-bit sequences by bit-shifting operation. FIG. 10 illustrates an example bit-depth conversion based on bit-shifting. As shown in FIG. 10, an 8-bit pixel can be obtained by right-shifting the higher 8 bits of the 16-bit pixel y and discarding the lower 8 bits. Similarly, a 10-bit pixel can be obtained by right-shifting the higher 10 bits of the 16-bit pixel y and discarding the lower 6 bits. This process can be formulated as follows (Note: >> is a right shift operator):

$$z = \begin{cases} y \gg 8, \text{ if } z \text{ is a 8-bit pixel,} \\ y \gg 6, \text{ if } z \text{ is a 10-bit pixel,} \end{cases} \tag{4}$$

Figure 11C:
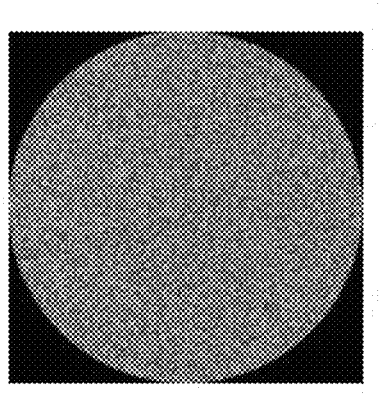
FIG. 11C is an 8-bit image obtained by performing the bit-shifting based bit-depth conversion operation of FIG. 10 on the 16-bit image of FIG. 11A in one example.
Figure 11B:
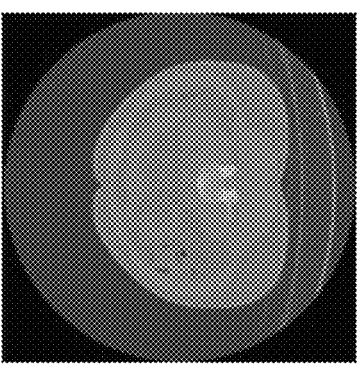
FIG. 11B is an 8-bit image obtained by performing the bit-shifting based bit-depth conversion operation of FIG. 10 on the 16-bit image of FIG. 11A in one example.
Figure 11A:
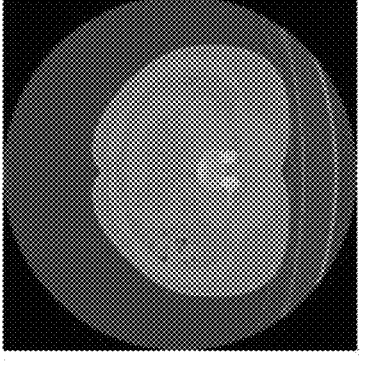
FIG. 11A is a 16-bit image of a slice generated from a 3D CT image in one example.

FIGS. 11A to 11C show the images before (FIG. 11A) and after (FIGS. 11B and 11C) processing by the bit-depth conversion module 502B using the bit-depth conversion based on bit-shifting of FIG. 10.

In the embodiment of the encoding operation 500 of FIG. 5, flags are used and written to bitstream, to indicate one or more properties of the processing performed by the data conversion module 502 (e.g., technique(s)/method(s) used in the data conversion module 502). In one example, the data range of 3D medical image $\{x_{min}, x_{max}\}$ is represented by two 32-bit flags and the bit-depth conversion method is indicated by a 1-bit flag. The 1-bit flag may be set to 0 if the bit-depth conversion based on bit-interlacing is used and may be set to 0 if the bit-depth conversion based on bit-shifting is used, or vice versa, for example. In one example, if the bit-depth conversion based on bit-shifting is used, an additional flag may be used to indicate whether the bit-depth of converted sequences is equal to 8. In some examples, the bit consumption of flags is up to 63 bits, which is negligible.

In the embodiment of the encoding operation 500 of FIG. 5, the video encoder 504 uses advanced video coding methods to compress the 2D medical sequences, to obtained improved coding efficiency of the 2D medical sequence. In one example, a hierarchical B coding structure and a bi-directional prediction technique are used to reduce inter-frame redundancy in the 2D medical sequences. For example, the frames of the 2D medical sequence can be divided into 4 different temporal layers and predicted by forward and backward reference frames to remove inter-frame redundancy. In one example, intra-frame prediction technique is used to reduce spatial redundancy in the 2D medical sequences. The video bitstream generated by the video encoder 504 is written to a file for storage.

Figure 12:
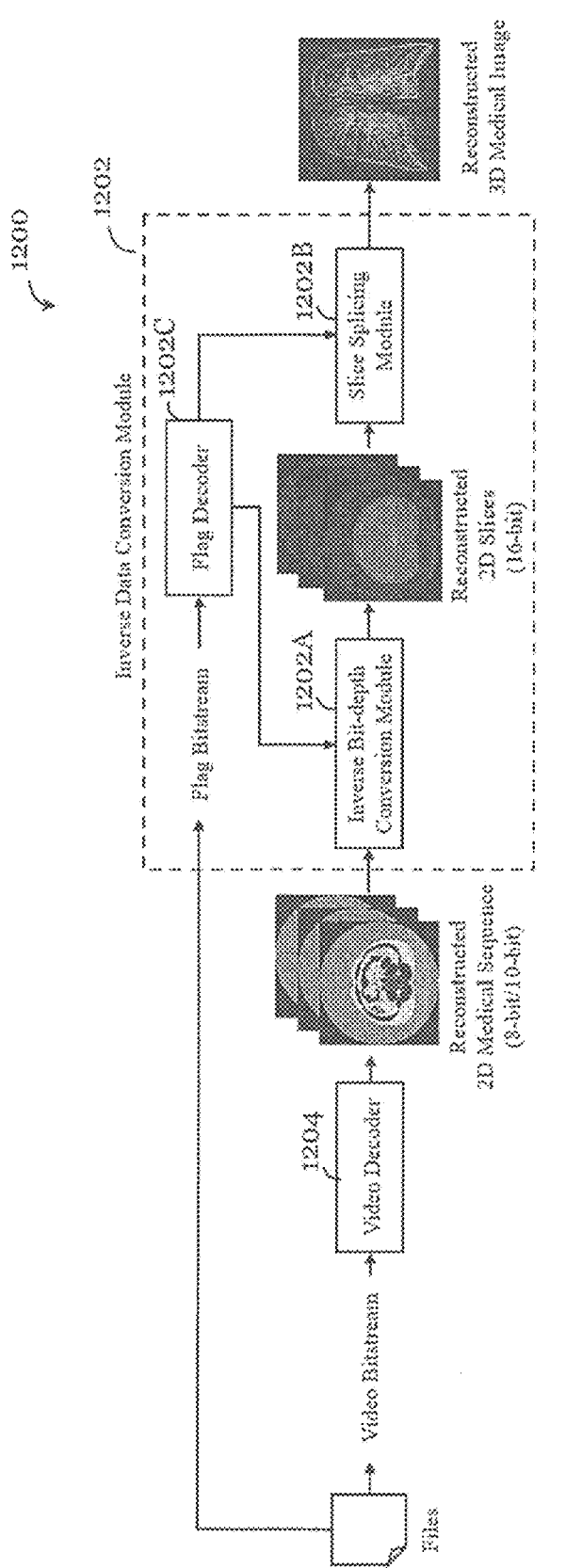
FIG. 12 is a schematic diagram illustrating a decoding operation for reconstructing a 3D medical image in one embodiment of the invention.

FIG. 12 illustrates a decoding operation 1200 for reconstructing a 3D medical image in one embodiment of the invention. The decoding operation 1200 in FIG. 12 can be considered as a specific example of the method 400 of FIG. 4, as the decoding operation 1200 also generally includes performing a video decoding operation to decode encoded content data to obtain video data of a sequence of frames, and performing an inverse data conversion operation to convert the video data of the sequence of frames into image data of a 3D medical image. The various modules and decoders illustrated in the decoding operation 1200 in FIG. 12 can be implemented by hardware and/or software.

In this embodiment, in the decoding operation 1200, the video bitstream is loaded from the file and is processed by a video decoder 1204 to reconstruct the 2D medical sequence. Also, the flag bitstream corresponding to flags of the data conversion module 502 are decoded by a flag decoder 1202C and are used to prepare or initialize the inverse data conversion module 1202. The inverse data conversion module 1202 is used to convert the reconstructed 2D medical sequence to a reconstructed 3D medical image, in which the 16-bit 2D slices are retrieved by the inverse bit-depth conversion module 1202A and then spliced into the reconstructed 3D medical image by the slice splicing module 1202B. In this embodiment, in the decoding operation 1200, the video decoder 1204 is used to read the video bitstream corresponding to the 2D medical sequence and decompress the video bitstream to obtain the reconstructed 2D medical sequence.

In this embodiment, the inverse data conversion module 1202 helps to reconstruct a 3D medical image from the decoded 2D medical sequences. In this embodiment, the inverse data conversion module 1202 includes the flag decoder 1202C, the inverse bit-depth conversion module 1202A, and the slice splicing module 1202B. In one example operation, flags of the data conversion module 502 are first decoded by the flag decoder 1202C and are used to prepare or initialize the inverse bit-depth conversion module 1202A and the slice splicing module 1202B. Then, the inverse bit-depth conversion module 1202A converts the decoded 2D medical sequences to 2D slices.

In one embodiment, the inverse bit-depth conversion module 1202A is arranged to perform inverse bit-depth conversion based on inverse bit-interlacing, which generally corresponds to an inverse operation of the bit-interlacing (e.g., the inverse operation of the example bit-depth conversion based on bit-interlacing in FIG. 8). In one embodiment, the inverse bit-depth conversion module 1202A is arranged to perform inverse bit-depth conversion based on inverse bit-shifting, which generally corresponds to an inverse operation of the bit-shifting (e.g., the inverse operation of the example bit-depth conversion based on bit-shifting in FIG. 10). In one embodiment, a selection between inverse bit-depth conversion based on inverse bit-shifting and inverse bit-depth conversion based on inverse bit-interlacing is made based on a decoded flag.

Figure 13:
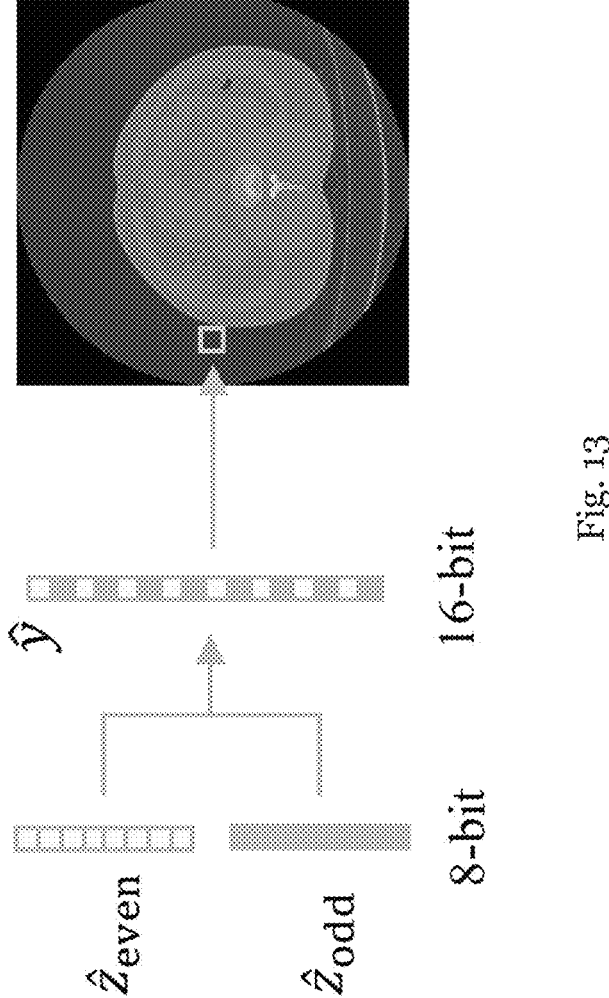
FIG. 13 is a schematic diagram illustrating an inverse bit-interlacing based inverse bit-depth conversion operation in one embodiment of the invention.

FIG. 13 illustrates an example inverse bit-depth conversion based on inverse bit-interlacing. In this example, two 8-bit decoded 2D medical sequences are concatenated to form 16-bit slices, in which bits of pixels of two 8-bit sequences are interleaved to generate 16-bit pixels. In an example inverse bit-depth conversion based on bit-shifting, 16-bit pixels are generated by bitwise left-shifting the decoded 8-bit or 10-bit pixels, where the lower bits that are vacated after bit-shifting are filled with 0.

After the inverse bit-depth conversion, the reconstructed 16-bit slices are mapped to the data range of the 3D medical image according to $\{x_{min}, x_{max}\}$ decoded from the flag bitstream, and the slices are stacked along a specified axis to reconstruct the 3D medical image. The mapping process can be formulated as follows:

$$\hat{x} = \frac{x_{max} - x_{min}}{2^{16}} \cdot \hat{y} + x_{min}, \tag{5}$$

where $\hat{y}$ denotes the decoded 16-bit pixel and $\hat{x}$ denotes the data of the reconstructed 3D medical image.

Figure 14:
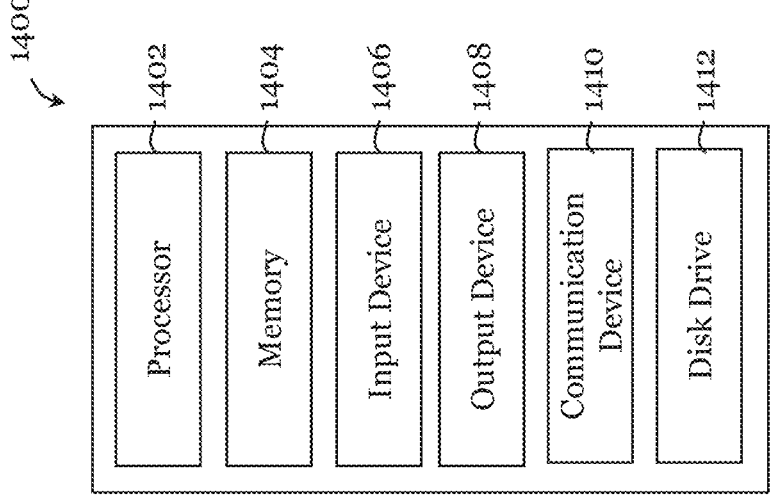
FIG. 14 is a schematic diagram illustrating a data processing system in some embodiments of the invention.

FIG. 14 shows an example data processing system 1400 in some embodiments of the invention. The data processing system 1400 can be used to perform one or more of the method embodiments of the invention. The data processing system 1400 can be used to implement, e.g., the system 100 of FIG. 1, the system 200 of FIG. 2, the system or system component(s) (e.g., encoder, module, etc.) in the encoding operation 500 of FIG. 5, the system or system component(s) (e.g., decoder, module, etc.) in the decoding operation 1200 of FIG. 12. The data processing system 1400 generally comprises suitable components necessary to receive, store, and execute appropriate computer instructions, commands, and/or codes. The main components of the data processing system 1400 are a processor 1402 and a memory (storage) 1404. The processor 1402 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 1404 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1404. Computer instructions for executing or facilitating executing the method embodiments of the invention may be stored in the memory 1404. The processor 1402 and memory (storage) 1404 may be integrated or separated (and operably connected). Optionally, the data processing system 1400 further includes one or more input devices 1406. Example of such input device 1406 include: keyboard, mouse, stylus, image scanner, microphone, tactile/touch input device (e.g., touch sensitive screen), image/video input device (e.g., camera), etc. The input device may be used to receive user input related to a data range or data boundary. Optionally, the data processing system 1400 further includes one or more output devices 1408. Example of such output device 1408 include: display (e.g., monitor, screen, projector, etc.), speaker, headphone, earphone, printer, additive manufacturing machine (e.g., 3D printer), etc. The display may include an LCD display, a LED/OLED display, or other suitable display, which may or may not be touch sensitive. The display may be used to display images (2D or 3D) provided by (e.g., that can be generated by) the processor 1402. The data processing system 1400 may further include one or more disk drives 1412 which may include one or more of: solid state drive, hard disk drive, optical drive, flash drive, magnetic tape drive, etc. A suitable operating system may be installed in the data processing system 1400, e.g., on the disk drive 1412 or in the memory 1404. The memory 1404 and the disk drive 1412 may be operated by the processor 1402. Optionally, the data processing system 1400 also includes a communication device 1410 for establishing one or more communication links (not shown) with one or more other computing devices, such as servers, personal computers, terminals, tablets, phones, watches, IoT devices, or other wireless computing devices. The communication device 1410 may include one or more of: a modem, a Network Interface Card (NIC), an integrated network interface, an NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1402, the memory 1404 (optionally the input device(s) 1406, the output device(s) 1408, the communication device(s) 1410 and the disk drive(s) 1412, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the data processing system 1400 is merely an example and that in other embodiments the data processing system 1400 can have different configurations (e.g., include additional components, has fewer components, etc.).

Although not required, one or more embodiments described with reference to the Figures can be implemented as an application programming interface (API) or as a series of libraries for use by a developer or can be included within another software application, such as a terminal or computer operating system or a portable computing device operating system. In one or more embodiments, as program modules include routines, programs, objects, components, and data files assisting in the performing of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

Some embodiments of the invention provide a 3D medical image compression paradigm based on video codec. In some embodiments, the video codec may include a data conversion module, an encoder, a decoder, and an inverse data conversion module. In some embodiments, the data format conversion module is designed to convert 3D medical images to 2D medical sequences, and the data format conversion module includes a slice partition module arranged to split 3D medical image into 2D slices and a bit-depth conversion module arranged to convert partitioned slices to 2D medical sequences that can be compressed by video codec. In some embodiments, an advanced video encoder is used to effectively compress 2D medical sequences to compact bitstream. In some embodiments, a video decoder is used to decompress the bitstream to reconstructed 2D medical sequences. In some embodiments, the inverse data conversion module, which includes an inverse bit-depth conversion module and a slice splicing module, is designed to convert reconstructed 2D medical sequences to reconstructed 3D medical image. Through one or more of these features, some embodiments of the invention can provide good performance in 3D medical image compression.

Some embodiments of the invention have provided a 3D medical image compression method based on video coding to achieve competitive coding performance by converting 3D medical images into sequences and compressing them using video coding methods. Some embodiments of the invention have provided a pipeline for the conversion of 3D medical images to 2D sequences, in which the 3D medical image is partitioned into slices, and the set of slices is then converted to sequences that can be processed by the video encoder using the bit-depth conversion module. Some embodiments of the invention have provided bit-depth conversion techniques e.g., the bit-depth conversion based on bit-interlacing and the bit-depth conversion based on bit-shift, for efficient conversion of slice sets to sequences. Some embodiments of the invention have provided a pipeline for the inverse conversion of decoded 2D sequences to 3D medical images, in which decoded 2D sequences are converted to a set of slices using inverse bit-depth conversion, and then the set of slices is spliced to reconstructed 3D medical images. Some embodiments of the invention, with the data conversion module, can effectively convert 3D medical image to sequences that can be compressed by existing video codecs. Some embodiments of the invention apply advanced video coding methods to converted sequences to achieve significant compression efficiency. Some embodiments of the invention use the inverse data conversion module to effectively converse decoded sequences to reconstructed 3D medical image. Through one or more of these features, some embodiments of the invention can provide competitive performance in 3D medical image compression. Some embodiments of the invention can be deployed on existing coding platforms.

The scheme in some embodiments of the invention can adapt to different bit-rate requirements and the performance is relatively promising at high bitrate and low bitrate coding scenarios. The method in some embodiments of the invention is configurable or re-configurable. For example, the video encoder and video decoder can be configured by users and the target bitrate can also be specified or adjusted based on applications.

Tests are performed using datasets of CT medical images and MRI medical images to verify the performance of the operations 500, 1200 embodiments. In one test, the operations 500, 1200 are tested on a dataset of CT medical images, using four target bitrates (2.0, 3.0, 4.0 and 5.0). It is found that the operations 500, 1200 can provide reconstructed medical images with high quality in terms of fidelity, and the peak-to-noise ratio (PSNR) can be up to 58.61 dB. In another test, the operations 500, 1200 are tested on a dataset of MRI medical images, using four target bitrates (0.8, 1.2, 1.6 and 2.0). It is found that the operations 500, 1200 can provide reconstructed medical images with high quality in terms of fidelity, and the peak-to-noise ratio (PSNR) can be up to 63.22 dB.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). The systems and/or methods of this disclosure may be applied for use in processing other 3D images (e.g., non-medical 3D images).

The invention claimed is:

1. A method for compressing 3D medical image, comprising:
obtaining image data of a 3D medical image;
performing a data conversion operation to convert the image data of the 3D medical image into video data of a sequence of frames, each of the frames corresponding to a respective 2D image;
wherein the performing the data conversion operation further comprises:
processing the image data of the 3D medical image to obtain image data of a plurality of 2D images; and
performing a bit-depth conversion operation on the image data of the plurality of 2D images to obtain the video data of the sequence of frames;
and
performing a video encoding operation to encode the video data of the sequence of frames to obtain encoded content data;
wherein the encoded content data is operable for reconstruction of the 3D medical image.

2. The method of claim 1, wherein processing the image data of the 3D medical image to obtain image data of the plurality of 2D images comprises:
partitioning the 3D medical image along an axis perpendicular to a partition plane to obtain a plurality of slices that can be represented as the plurality of 2D images; and for each pixel of each of the plurality of 2D images, respectively mapping the pixel to an n-bit integer to obtain a n-bit pixel.

3. The method of claim 2, wherein n is 8, 10, or 16.

4. The method of claim 2, wherein the mapping is performed based on a data range or data boundary of the 3D medical image.

5. The method of claim 2, wherein the bit-depth conversion operation is based on bit-interlacing.

6. The method of claim 5, wherein the bit-depth conversion operation based on bit-interlacing comprises:
converting each n-bit pixel into two respective m-bit pixels; and
forming two m-bit sequences based on the m-bit pixels of the plurality of 2D images;
wherein the video data of the sequence of frames comprises the two m-bit sequences.

7. The method of claim 6, wherein n=16 and m=8.

8. The method of claim 6, wherein for each of the n-bit pixel, the converting respectively includes:
applying a first bit mask to the n-bit pixel to extract m bits;
applying a second bit mask to the n-bit pixel to extract another m bits;
concatenating the m bits to an m-bit pixel; and
concatenating the another m bits to another ma-bit pixel.

9. The method of claim 8,
wherein applying a first bit mask to the n-bit pixel to extract m bits comprises applying the first bit mask to the n-bit pixel to extract m even-position bits; and
wherein applying a second bit mask to the n-bit pixel to extract another m bits comprises applying a second bit mask to the n-bit pixel to extract m odd-position bits.

10. The method of claim 2, wherein the bit-depth conversion operation is based on bit-shifting.

11. The method of claim 10, wherein the bit-depth conversion operation based on bit-shifting comprises:
converting each n-bit pixel into a respective m-bit pixel; and
forming a m-bit sequence based on the m-bit pixels of the plurality of 2D images;
wherein the video data of the sequence of frames comprises the m-bit sequence.

12. The method of claim 11, wherein n=16 and m=8 or 10.

13. The method of claim 11, wherein for each of the n-bit pixel, the converting respectively includes:
performing bitwise right-shifting on higher m bits of the n-bit pixel, and
discarding or dropping lower n−m bits of the n-bit pixel, thereby forming the m-bit pixel.

14. The method of claim 2, wherein the data conversion operation further comprises:
generating a data conversion indicator indicating one or more properties associated with the processing of the image data of the 3D medical image and/or the performing of the bit-depth conversion operation; and
performing an encoding operation to encode the data conversion indicator to obtain encoded data conversion indicator data;
wherein the encoded data conversion indicator data is operable for facilitating reconstruction of the 3D medical image.

15. The method of claim 1, wherein the video encoding operation is arranged to:
reduce inter-frame redundancy of the video data of the sequence of frames; and/or
reduce intra-frame redundancy of the video data of the sequence of frames.

16. The method of claim 1, wherein the video encoding operation is based on Versatile Video Coding (VVC).

17. The method of claim 1, wherein the video encoding operation is based on High Efficiency Video Coding (HEVC).

18. The method of claim 1, wherein the video encoding operation is based on H.264/MPEG-4 Advanced Video Coding (AVC).

19. The method of claim 1, wherein the video encoding operation is based on Audio Video coding Standard (AVS), such as AVS3.

20. The method of claim 1, wherein the 3D medical image is a magnetic resonance imaging (MRI) image.

21. The method of claim 1, wherein the 3D medical image is a computed tomography (CT) image.

22. A system for compressing 3D medical image, comprising:
one or more processors; and
memory storing one or more programs configured to be executed by the one or more processors, the one or more programs including instructions for performing or facilitating performing of the method of claim 1.

23. A method for reconstructing 3D medical image, comprising:
performing a video decoding operation to decode encoded content data to obtain video data of a sequence of frames, each of the frames corresponding to a respective 2D image; and
performing an inverse data conversion operation to convert the video data of the sequence of frames into image data of a 3D medical image; wherein performing the inverse data conversion operation comprises:
performing an inverse bit-depth conversion operation on the video data of the sequence of frames to obtain image data of a plurality of 2D images; and
processing the image data of the plurality of 2D images to obtain the image data of the 3D medical image, wherein the image data of the 3D medical image is operable for reconstructing the 3D medical image.

24. The method of claim 23, wherein the video decoding operation is based on Versatile Video Coding (VVC).

25. The method of claim 23, wherein the video decoding operation is based on High Efficiency Video Coding (HEVC).

26. The method of claim 23, wherein the video decoding operation is based on H.264/MPEG-4 Advanced Video Coding (AVC).

27. The method of claim 23, wherein the video decoding operation is based on Audio Video coding Standard (AVS), such as AVS3.

28. The method of claim 23, wherein the inverse bit-depth conversion operation is based on inverse bit-interlacing.

29. The method of claim 23, wherein the inverse bit-depth conversion operation is based on inverse bit-shifting.

30. The method of claim 23, wherein the plurality of 2D images comprises a plurality of n-bit pixels; and
wherein processing the image data of the plurality of 2D images to obtain the image data of the 3D medical image comprises:
for each n-bit pixel of each of the plurality of 2D images, respectively inversely mapping the n-bit pixel to a pixel based on a data range or data boundary; and
combining a plurality of slices represented by the plurality of 2D images with inversely mapped pixels along an axis perpendicular to a partition plane to obtain the 3D medical image.

31. The method of claim 23, wherein the inverse data conversion operation further comprises:
performing a decoding operation to decode encoded data conversion indicator data to obtain a data conversion indicator, the data conversion indicator indicating one or more properties associated with a processing of the image data of the 3D medical image and/or a performing of the bit-depth conversion operation;
wherein the data conversion indicator is operable for facilitating reconstruction of the 3D medical image.

32. A system for reconstructing 3D medical image, comprising:
one or more processors; and
memory storing one or more programs configured to be executed by the one or more processors,
the one or more programs including instructions for performing or facilitating performing of the method of claim 23.

\* \* \* \* \*